United States Patent
Kim et al.

(10) Patent No.: US 7,907,219 B2
(45) Date of Patent: Mar. 15, 2011

(54) DIGITAL TV AND CONTROL METHOD THEREOF FOR SAVING POWER CONSUMPTION

(75) Inventors: Je-Ik Kim, Suwon-si (KR); Ik-joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1234 days.

(21) Appl. No.: 11/510,564

(22) Filed: Aug. 28, 2006

(65) Prior Publication Data

US 2007/0064159 A1    Mar. 22, 2007

(30) Foreign Application Priority Data

Sep. 16, 2005   (KR) ................ 10-2005-0087102

(51) Int. Cl.
*H04N 5/46* (2006.01)
*H04N 5/63* (2006.01)
(52) U.S. Cl. ...................... 348/730; 348/729
(58) Field of Classification Search .............. 348/739, 348/730, 790, 794, 569, 554–555, 558, 731, 348/837, 838, 729; 455/343.1, 343.2
See application file for complete search history.

(56) References Cited

U.S. PATENT DOCUMENTS

| | | | | |
|---|---|---|---|---|
| 5,513,385 A * | 4/1996 | Tanaka | | 455/228 |
| 5,701,599 A * | 12/1997 | Aihara | | 455/186.1 |
| 6,515,716 B1 * | 2/2003 | Suzuki et al. | | 348/730 |
| 6,731,346 B1 * | 5/2004 | Nonomura et al. | | 348/554 |
| 2004/0047600 A1 * | 3/2004 | Choo | | 386/84 |
| 2004/0080675 A1 * | 4/2004 | Hoshino | | 348/731 |
| 2005/0219423 A1 * | 10/2005 | Kamise et al. | | 348/730 |
| 2005/0264702 A1 * | 12/2005 | Yoshii | | 348/687 |
| 2006/0285024 A1 * | 12/2006 | Chou et al. | | 348/790 |

FOREIGN PATENT DOCUMENTS

| | | |
|---|---|---|
| JP | 09-037226 A | 2/1997 |
| JP | 200216854 A | 1/2002 |
| KR | 1997-0056848 A | 7/1997 |
| KR | 1999-025735 A | 4/1999 |
| KR | 1999-025736 A | 4/1999 |
| KR | 10-2002-0096001 A | 12/2002 |
| KR | 2005-0050315 A | 5/2005 |

* cited by examiner

*Primary Examiner* — Victor Kostak
(74) *Attorney, Agent, or Firm* — Sughrue Mion, PLLC

(57) ABSTRACT

A digital TV including a receiving part for receiving a broadcasting signal and broadcasting information, a video processing module and an audio processing module for reproducing video and audio corresponding to the broadcasting signal, respectively, a power source for supplying power, and a controller for determining whether a video signal is included in the broadcasting signal based on the broadcasting information and controlling the power source to interrupt the supply of power to the video processing module if the video signal is not included in the broadcasting signal is provided. The present invention provides a digital TV, which is capable of preventing unnecessary power consumption by interrupting the supply of power to a video processing module during playback of an audio broadcasting, and a control method thereof.

12 Claims, 3 Drawing Sheets

DIGITAL TV AND CONTROL METHOD THEREOF FOR SAVING POWER CONSUMPTION

CROSS-REFERENCE TO RELATED APPLICATIONS

This application claims priority from Korean Patent Application No. 10-2005-0087102, filed on Sep. 16, 2005, in the Korean Intellectual Property Office, the disclosure of which is incorporated herein by reference.

BACKGROUND OF THE INVENTION

1. Field of the Invention

The present invention relates to a digital television (TV) and a control method thereof, and more particularly, to a digital TV, which is capable of saving power consumption by interrupting a supply of power to a video processing module during playback of an audio broadcasting, and a control method thereof.

2. Description of the Related Art

In recent years, with digital broadcasting becoming more popular, digital TVs are increasingly found in homes and offices. In digital broadcasting, unlike analog broadcasting, a video signal and an audio signal are converted into digital signals, which are then compressed, packetized, and transmitted as a transport stream. Also, in digital broadcasting, in addition to the video signal and the audio signal, Program and System Information Protocol (PSIP) information having various additional data including channel information are packetized and included in the transport stream for transmission.

In some instances, depending on viewer preference and a specific type of digital broadcasting, there may arise a need to broadcast only the audio playback without a video image. That is, the audio broadcasting is to provide only the audio signal without the video signal. Conventionally, in such instances, an audio signal included in a received broadcasting signal is processed for the audio playback, however, the video image is not reproduced since the video signal is not included in the broadcasting signal.

As mentioned above, since the video image is not reproduced in the playback of the audio broadcasting, the video processing module has no need to perform a normal operation. Nonetheless, the conventional digital TVs still supply the video processing module with power required for the normal operation thereof, which results in unnecessary power consumption during the playback of the audio broadcasting.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a digital TV, which is capable of saving power consumption by interrupting the supply of power to a video processing module during playback of an audio broadcasting, and a control method thereof.

According to an aspect of the present invention, there is provided a digital TV comprising: a receiving part for receiving a broadcasting signal and broadcasting information on the broadcasting signal; a video processing module and an audio processing module for reproducing video and audio corresponding to the broadcasting signal, respectively; a power source for supplying power; and a controller for determining whether a video signal is included in the broadcasting signal based on the broadcasting information, and controlling the power source to interrupt the supply of power to the video processing module if the video signal is not included in the broadcasting signal.

The digital TV may further comprise a demultiplexer for dividing the broadcasting signal received via the receiving part into the video signal, audio signal and broadcasting information, outputting the video signal to the video processing module, and outputting the audio signal to the audio processing module, and the controller may determine whether the video signal is included in the broadcasting signal based on the broadcasting information output from the demultiplexer.

The broadcasting information may include PSIP information, and the controller may determine whether there exists a video packet identifier based on the PSIP information output from the demultiplexer and determine that the video signal is not included in the broadcasting signal if there is no video packet identifier.

The power source may comprise a power supply for outputting power and a switching part for opening/closing a power path through which the power is supplied from the power supply to the video processing module, and the controller may switch off the switching part if it is determined that the video signal is not included in the broadcasting signal.

The digital TV may further comprise a broadcasting notification part for outputting an audio broadcasting message notifying that current broadcasting is audio broadcasting, and the controller may control the broadcasting notification part to output the audio broadcasting message if it is determined that the video signal is not included in the broadcasting signal, and control the power source to interrupt the supply of power to the video processing module if a predetermined period of time elapses after the audio broadcasting message is output.

According to another aspect of the present invention, there is provided a method of controlling a digital TV comprising: receiving a broadcasting signal and broadcasting information on the broadcasting signal at a receiving part; reproducing video and audio corresponding to the broadcasting signal at a video processing module and an audio processing module, respectively; determining whether a video signal is included in the broadcasting signal based on the broadcasting information; and interrupting the supply of power to the video processing module if it is determined that the video signal is not included in the broadcasting signal.

The method may further comprise: providing a demultiplexer for dividing the broadcasting signal received via the receiving part into the video signal, audio signal and broadcasting information; outputting the video signal to the video processing module; and outputting the audio signal to the audio processing module, and the determining whether a video signal is included in the broadcasting signal may comprise determining whether the video signal is included in the broadcasting signal based on the broadcasting information output from the demultiplexer.

The broadcasting information may include PSIP information, and the determining whether a video signal is included in the broadcasting signal may comprise determining whether there exists a video packet identifier based on the PSIP information output from the demultiplexer, and determining that the video signal is not included in the broadcasting signal if there exists no video packet identifier.

The interrupting the supply of power to the video processing module comprises: outputting an audio broadcasting message notifying that current broadcasting is audio broadcasting if it is determined that the video signal is not included in the broadcasting signal; determining whether a predetermined period of time elapses after the audio broadcasting message is output; and interrupting the supply of power to the video processing module if it is determined that the predetermined period of time elapses.

BRIEF DESCRIPTION OF THE DRAWINGS

The above and/or other aspects of the present invention will become apparent and more readily appreciated by describing certain exemplary embodiments of the present invention with reference to the accompanying drawings, in which.

DETAILED DESCRIPTION OF THE EXEMPLARY EMBODIMENT

Figure 1:
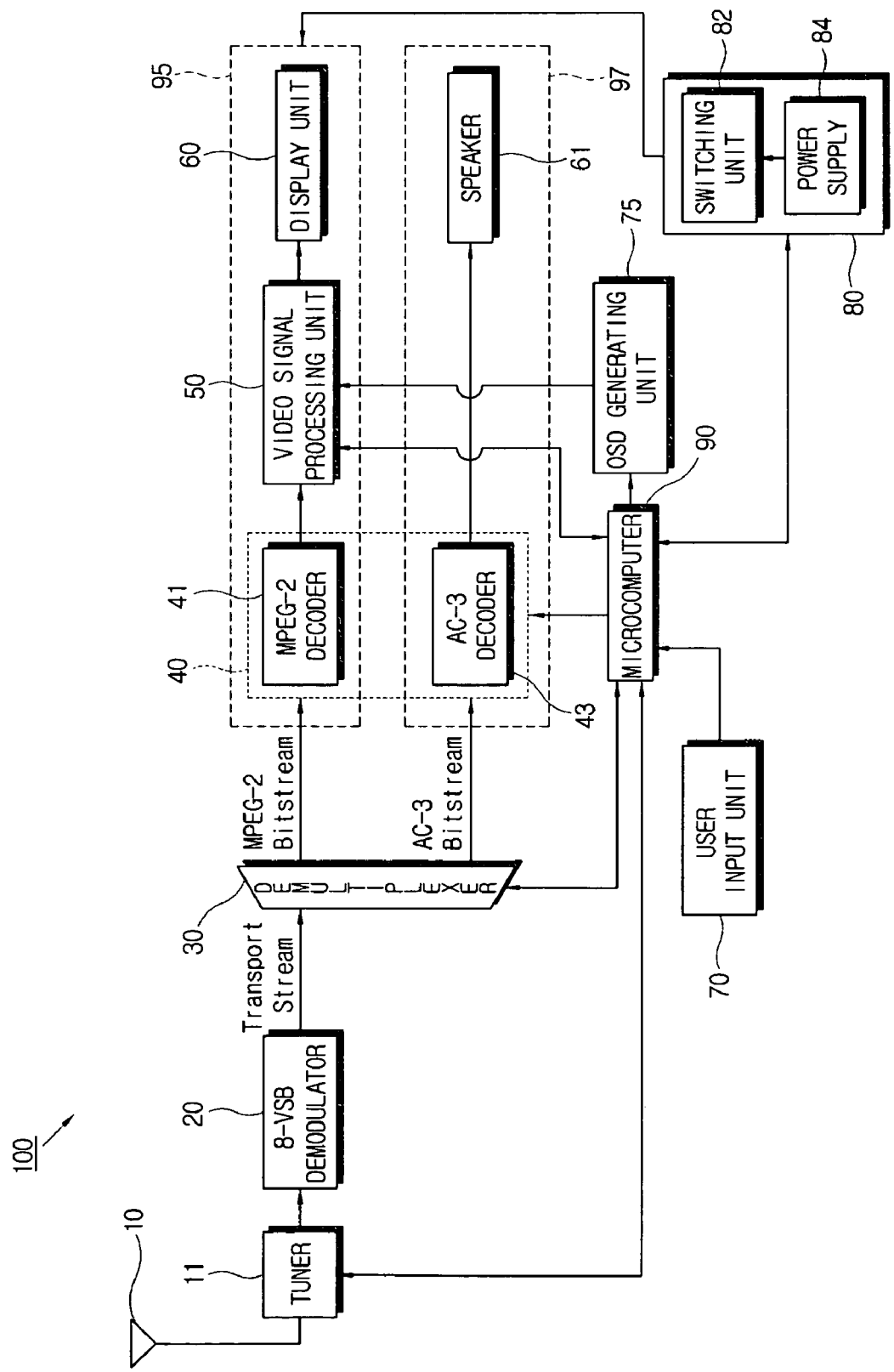
FIG. 1 is a control block diagram of a digital TV according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a control block diagram of a digital TV according to an exemplary embodiment of the present invention. As shown in the figure, a digital TV 100 of the present invention includes an antenna 10 for receiving a broadcasting signal, a tuner 11, an 8-VSB demodulator 20, a demultiplexer 30, a decoder 40, a video processing module 95 including an MPEG-2 decoder 41 of the decoder 40, a video signal processing unit 50 and a display unit 60, an audio processing module 97 including an AC-3 decoder 43 of the decoder 40 and a speaker 61, a user input unit 70, an On Screen Display (OSD) generating unit 75, a power source 80, and a microcomputer 90 for determining whether or not a video signal is included in the broadcasting signal and controlling the power source 80 to interrupt the supply of power to the video processing module 95 if the video signal is not included in the broadcasting signal.

Here, the digital broadcasting signal is transmitted in the form of a transport stream packetized by multiplexing the video signal, an audio signal and broadcasting information in time division.

Based on a tuning control signal from the microcomputer 90, which will be described later, the tuner 11 tunes the broadcasting signal received via the antenna 10 to a broadcasting signal having a frequency band corresponding to the tuning control signal. That is, the tuner 11 selects a broadcasting channel based on the tuning control signal from the microcomputer 90.

The tuned broadcasting signal of a particular channel is output in the form of the transport stream through a VSB demodulation process, error correction process and so on by the 8-VSB demodulator 20. Then, the demultiplexer 30 divides the output broadcasting signal in the form of the transport stream into the video signal, the audio signal and broadcasting information having various additional data defined as PSIP information, which are then output in the form of a bit stream.

As mentioned above, the video processing module 95 includes the MPEG-2 decoder 41 for decoding the video signal output from the demultiplexer 30, the video signal processing unit 50 for processing the video signal decoded in the MPEG-2 decoder 41 such that video is displayed on the display unit 60, and the display unit 60 for displaying a video image based on the video signal processed by the video signal processing unit 50.

Here, the display unit 60 may include various kinds of display modules such as a Cathode Ray Tube (CRT), Digital Light Processing (DLP), Liquid Crystal Display (LCD), Plasma Display Panel (PDP) and so on, and the video signal processing unit 50 may include a scaler for scaling the video signal to meet a vertical frequency, resolution, picture ratio and so on according to an output format of the display unit 60.

As mentioned above, the audio processing module 97 may include the AC-3 decoder 43 for decoding the audio signal output from the demultiplexer 30 and the speaker 61 for outputting audio sound based on the audio signal decoded in the AC-3 decoder 43.

The microcomputer 90 stores the various additional data, which are contained in the PSIP information output from the demultiplexer 30, in a predetermined memory (not shown) for each data table. In addition, data to be displayed among the additional data contained in the PSIP information are processed by the video signal processing unit 50 under the control of the microcomputer 90, which will be described later, and are combined with the tuned video signal. The combination of the data and the tuned video signal is output to the display unit 60. Optionally, the OSD generating unit 75 may generate a video signal corresponding to the additional data to be processed by the video signal processing unit 50 under the control of the microcomputer 90. Such operation will be described later.

Here, the PSIP information may include System Time Table (STT), Master Guide Table (MGT), Virtual Channel Table (VCT), Rating Region Table (RRT), Event Information Table (EIT), Extended Text Table (ETT) information and so on. In addition, the PSIP information may include a video packet identifier (PID) for identifying the video signal and an audio PID for identifying the audio signal.

The user input unit 70, which is a functional unit for user key input for controlling various functions of the digital TV 100, may include channel up/down keys and numeric keys for selection of a broadcasting channel and volume up/down keys for adjustment of sound volume. Such a user input unit 70 may include a radio remote controller including a plurality of keys, and a key signal generating unit for receiving a radio signal corresponding to key manipulation of the radio remote controller and generating a corresponding key signal. Here, the user input unit 70 may be a mouse, keyboard or the like, or may be prepared in a body panel of the digital TV 100.

The OSD generating unit 75, which is a broadcasting notification unit for notifying viewers that current broadcasting is audio broadcasting and is under the control of the microcomputer 90, generates an OSD audio broadcasting message notifying the viewers that the current broadcasting is audio broadcasting. Here, the notification of the audio broadcasting through the OSD generating unit 75 in the digital TV 100 is shown as a way of an example. One of ordinary skill in the art would appreciate that the digital TV 100 may have various alternative means for informing the viewers of the audio broadcasting, for example, such as through an alarming unit (not shown) for alarming that the current broadcasting is the audio broadcasting, instead of using the OSD generating unit 75.

The power source 80 supplies power to the video processing module 95. The power source 80, which is under the control of the microcomputer 90, includes a power supply 84 for outputting power and a switching unit 82 for opening/closing a power path through which the power is supplied from the power supply 84 to the video processing module 95.

In addition, although not shown in FIG. 1, the power source 80 may supply power to various functional units in the digital TV 100, for example, the tuner 11, the 8-VSB demodulator 20, the demultiplexer 30, the audio processing module 97, the user input unit 70, and the OSD generating unit 75, in addition to the video processing module 95.

The microcomputer 90 is a controller for controlling the various functional units in the digital TV 100 based on the key signal input through the user input unit 70. For example, when a broadcasting channel is selected through the user input unit 70, the microcomputer 90 controls the tuner 11 to be tuned to a broadcasting signal having a frequency band corresponding to the selected broadcasting channel to find the user-selected broadcasting channel. In addition, the microcomputer 90 controls the 8-VSB demodulator 20, the demultiplexer 30, the video processing module 95 and the audio processing module 97 in order to playback the video and audio corresponding to the received broadcasting signal.

When the broadcasting channel is changed, the microcomputer 90 determines whether or not the video packet identifier is included in the PSIP information output from the demultiplexer 30. If the video packet identifier is not included in the PSIP information, the microcomputer 90 determines that a video signal is not included in the current broadcasting signal.

Figure 3:
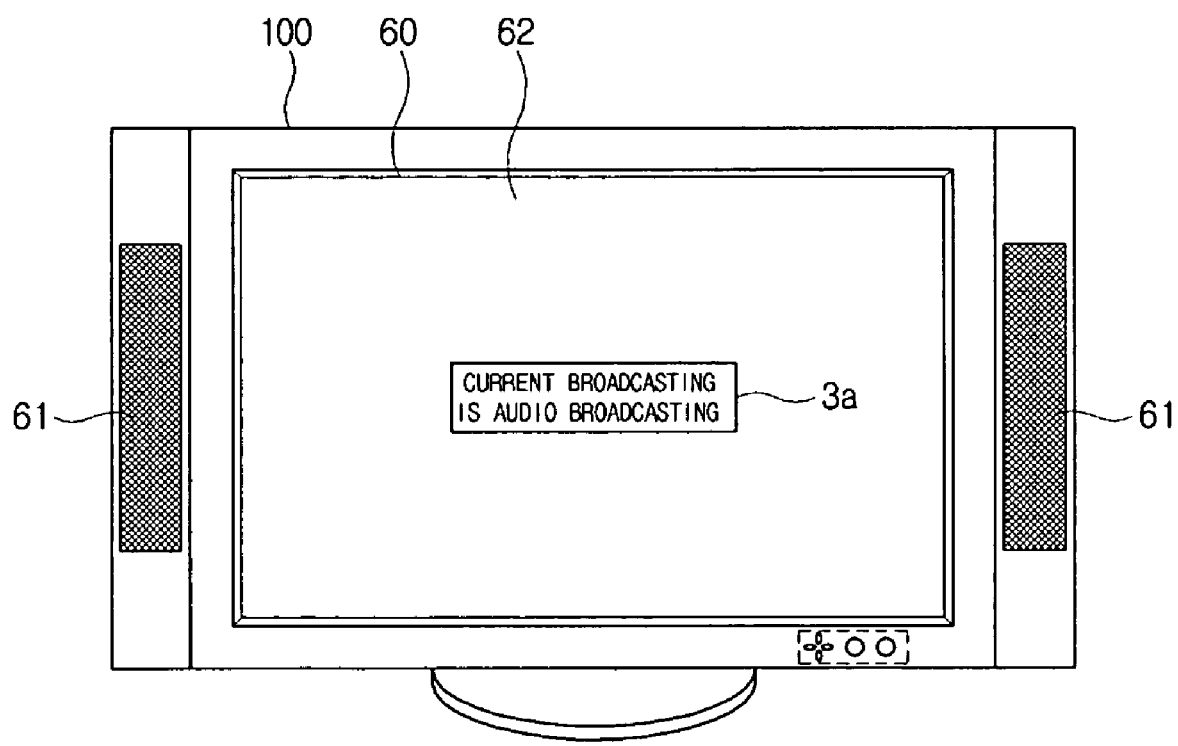
FIG. 3 is an exemplary view showing an audio broadcasting message displayed on the digital TV according to the exemplary embodiment of the present invention.

Thus, when the microcomputer 90 determines that the video signal is not included in the current broadcasting signal, it controls the OSD generating unit 75 to generate the audio broadcasting message (3a in FIG. 3) to notify the viewers that the current broadcasting is the audio broadcasting, as shown in FIG. 3. The OSD audio broadcasting message 3a generated is displayed on the display unit 60 through the video signal processing unit 50. That is, as shown in FIG. 3, a video screen 62 without a background, such as a black screen, and the audio broadcasting message 3a are displayed on the display unit 60. In such a case, the audio broadcasting message 3a may be displayed in a fixed screen region of the display unit 60 or may be displayed while moving on the screen of the display unit 60.

After the OSD audio broadcasting message generated in the OSD generating unit 75 is displayed on the display unit 60, the microcomputer 90 determines whether a predetermined period of time has elapsed. If the predetermined period of time has elapsed, the microcomputer 90 switches off the switching unit 82 of the power source 80 in order to interrupt the supply of power to the video processing module 95. Thus, the supply of power from the power supply 84 to the video processing module 95 is interrupted. At this time, although the supply of power from the power source 80 to the video processing module 95 is interrupted, power continues to be supplied to functional units other than the video processing module 95.

As such, subsequently, the audio broadcasting message 3a displayed on the video screen 62 of the display unit 60 is also removed and the video screen 62 comes into a blank non-background state just like during a power-off state of the digital TV 100.

As described above, when the audio broadcasting with no video signal is reproduced, the digital TV 100 of the present invention may prevent the unnecessary power consumption by interrupting the supply of power to the video processing module 95 which does not require a normal operation.

Although it is illustrated in FIG. 1 that the digital TV 100 of the present invention interrupts the supply of power to the video processing module 95, that is, to the MPEG-2 decoder 41, the video signal processing unit 50 and the display unit 60, the digital TV 100 of the present invention may also save power consumption during playback of the audio broadcasting by interrupting the supply of power to at least one of the MPEG-2 decoder 41, the video signal processing unit 50 and the display unit 60.

Figure 2:
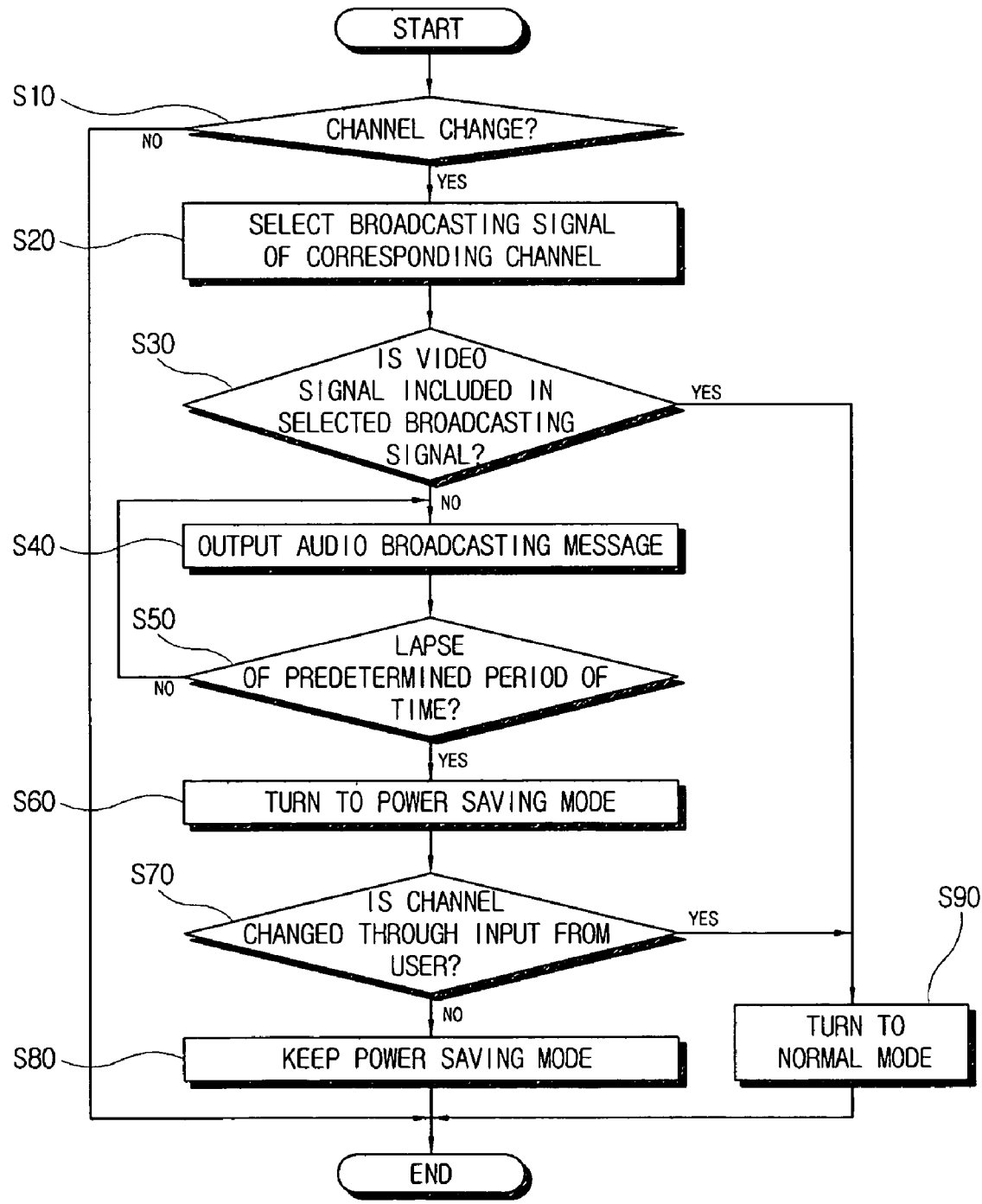
FIG. 2 is a control flow chart of the digital TV according to the exemplary embodiment of the present invention.

Now, a control method of the digital TV of the present invention as exemplarily configured above will be described with reference to FIG. 2.

First, the digital TV 100 operates in a normal mode where a normal operation of reproducing video and audio corresponding to a broadcasting signal of a tuned broadcasting channel is performed under the control of the microcomputer 90. Based on the input from the user input unit 70, the microcomputer 90 determines at operation S10 whether a broadcasting channel is selected to change. When the broadcasting channel is selected to change, the microcomputer 90 controls the tuner 11 to select a broadcasting signal corresponding to the selected broadcasting channel at operation S20. Then, the 8-VSB demodulator 20 and the demultiplexer 30 process the selected broadcasting signal received from the tuner 11. Based on the PSIP information output from the demultiplexer 30, the microcomputer 90 determines at operation S30 whether the video packet identifier is present, that is, whether the video signal is included in the broadcasting signal currently received.

If it is determined that there is no video packet identifier and the video signal is not included in the broadcasting signal, the microcomputer 90 controls the OSD generating unit 75 to output the audio broadcasting message 3a at operation S40. At this time, if the audio signal is included in the broadcasting signal, the audio processing module 97 processes the audio signal output from the demultiplexer 30. Next, the microcomputer 90 determines at operation S50 whether a predetermined period of time has elapsed since outputting the audio broadcasting message 3a at operation S40. If it is determined that the predetermined period of time has elapsed, at operation S60, the microcomputer 90 switches off the switching unit 82 of the power source 80 to place the digital TV 100 in a power saving mode in which the supply of power to the video processing module 95 is interrupted. At this time, the operation S20 is performed when the broadcasting channel is changed through the input from the user input unit 70, prior to the lapsing of the predetermined period of time described at operation S50.

After placing the digital TV 100 in the power saving mode at operation S60, the microcomputer 90 determines at operation S70 whether the broadcasting channel is changed through the subsequent input from the user input unit 70. If it is determined that the broadcasting channel has not been changed, the digital TV keeps the power saving mode at operation S80. If it is determined that the broadcasting channel has been changed subsequently, at operation S90, the microcomputer 90 switches on the switching unit 82 of the power source 80 to place the digital TV 100 in a normal mode in which power is normally supplied to the video processing module 95. Thus, the digital TV 100 performs a normal operation of reproducing video and audio corresponding to a broadcasting signal of a broadcasting channel selected by the change of broadcasting channel under control of the microcomputer 90.

As described above, according to the control method of the digital TV of the present invention, when the audio broadcasting with no video signal is reproduced, the digital TV may prevent unnecessary power consumption by interrupting the supply of power to the video processing module requiring no normal operation.

In the above description, since it is common that a broadcasting channel providing no video signal continues to not provide the video signal, it is decided at operation S70 whether the digital TV should revert back to the normal mode by determining whether the broadcasting channel is changed. However, it is possible for a video signal to be provided even when initially it was determined that no video signal is included in the selected broadcasting signal and the audio broadcasting is outputted. As such, even after turning the digital TV 100 into the power saving mode at operation S60, the microcomputer 90 continues to check the PISP information output from the demultiplexer 30, and, if it is determined that the video signal is starting to be provided, the microcomputer 90 may switch on the switching unit 82 of the power source 80 to revert the digital TV back into the normal mode.

As described above, in the digital TV and the control method thereof according to the exemplary embodiment of the present invention, it is determined whether there is a video signal by examining the broadcasting information when the broadcasting channel is changed, and the supply of power to the video processing module 95 requiring no normal operation is interrupted when the audio broadcasting with no video signal is reproduced. Accordingly, the digital TV and the control method thereof of the present invention can prevent unnecessary power consumption.

As apparent from the description, the present invention provides a digital TV, which is capable of saving power by interrupting the supply of power to a video processing module during playback of audio broadcasting, and a control method thereof.

Although a particular exemplary embodiment of the present invention has been shown and described, it will be appreciated by those ordinarily skilled in the art that changes may be made in this exemplary embodiment without departing from the principle and spirit of the invention, the scope of which is defined in the appended claims and their equivalents.

What is claimed is:

1. A digital television which receives a broadcasting signal, the digital television comprising:
   a video processing module which reproduces video corresponding to the broadcasting signal;
   and an audio processing module which reproduces audio corresponding to the broadcasting signal;
   a power source which supplies power;
   a controller which determines whether a video signal is included in the broadcasting signal by examining broadcasting information included in the broadcasting signal and controls the power source to interrupt the supply of power to the video processing module if the video signal is not included in the broadcasting signal; and
   a broadcasting notification part which outputs an audio broadcasting message which notifies that current broadcasting is audio broadcasting,
   wherein the controller controls the broadcasting notification part to output the audio broadcasting message if it is determined that the video signal is not included in the broadcasting signal, and controls the power source to interrupt the supply of power to the video processing module if a period of time elapses after the audio broadcasting message is output.

2. The digital television according to claim 1, further comprising a receiving part which receives the broadcasting signal and the broadcasting information.

3. The digital television according to claim 2, further comprising a demultiplexer which divides the broadcasting signal received by the receiving part into the video signal, an audio signal and the broadcasting information, and outputs the video signal to the video processing module and the audio signal to the audio processing module,
   wherein the controller determines whether the video signal is included in the broadcasting signal by examining the broadcasting information output by the demultiplexer.

4. The digital television according to claim 3, wherein the broadcasting information includes Program and System Information Protocol (PSIP) information, and
   wherein the controller determines whether a video packet identifier is present by examining the PSIP information output by the demultiplexer and determines that the video signal is not included in the broadcasting signal if there is no video packet identifier in the PSIP information.

5. The digital television according to claim 4, wherein the power source comprises:
   a power supply which outputs power; and
   a switching part which opens or closes a power path through which power is supplied from the power supply to the video processing module,
   wherein the controller switches off the switching part to open the power path if the video signal is not included in the broadcasting signal.

6. The digital television according to claim 5, further comprising a broadcasting notification part which outputs an audio broadcasting message which notifies that current broadcasting is audio broadcasting,
   wherein the controller controls the broadcasting notification part to output the audio broadcasting message if it is determined that the video signal is not included in the broadcasting signal, and controls the power source to interrupt the supply of power to the video processing module if a period of time elapses after the audio broadcasting message is output.

7. A method of controlling a digital television which receives a broadcasting signal, the method comprising:
   determining whether a video signal is included in the broadcasting signal by examining broadcasting information included in the broadcasting signal;
   outputting an audio broadcasting message which notifies that current broadcasting is audio broadcasting if it is determined that the video signal is not included in the broadcasting signal;
   determining whether a period of time has elapsed after the audio broadcasting message is output; and
   interrupting supply of power to a video processing module of the digital television if it is determined that the video signal is not included in the broadcasting signal and the period of time elapses after the audio broadcasting message is output.

8. The method according to claim 7, the method further comprising:
   dividing the broadcasting signal into the video signal, an audio signal and the broadcasting information;
   outputting the video signal to the video processing module; and
   outputting the audio signal to an audio processing module of the digital television,
   wherein the determining whether the video signal is included in the broadcasting signal comprises examining the broadcasting information divided from the broadcasting signal.

9. The method according to claim 8, wherein the dividing the broadcasting signal is performed by a demultiplexer.

10. The method according to claim 9, wherein the broadcasting signal is initially received at a receiving part of the digital television.

11. The method according to claim 8, wherein the broadcasting information includes Program and System Information Protocol (PSIP) information, and
wherein the determining whether the video signal is included in the broadcasting signal further comprises:
determining whether a video packet identifier is present by examining the PSIP information; and
determining that the video signal is not included in the broadcasting signal if there is no video packet identifier in the PSIP information.

12. The method according to claim 11, wherein the interrupting the supply of power to the video processing module comprises:

outputting an audio broadcasting message notifying that current broadcasting is audio broadcasting if the video signal is not included in the broadcasting signal, determining whether a period of time has elapsed after the audio broadcasting message is output; and interrupting the supply of power to the video processing module if it is determined that the predetermined period of time has elapsed.

\* \* \* \* \*